United States Patent [19]

DeLeo et al.

[11] 4,378,696

[45] Apr. 5, 1983

[54] PRESSURE SENSOR FOR DETERMINING AIRSPEED ALTITUDE AND ANGLE OF ATTACK

[75] Inventors: Richard V. DeLeo, Hopkins; Floyd W. Hagen, Eden Prairie, both of Minn.

[73] Assignee: Rosemount Inc., Eden Prairie, Minn.

[21] Appl. No.: 236,900

[22] Filed: Feb. 23, 1981

[51] Int. Cl.³ .................... G01C 21/00; G01P 5/165
[52] U.S. Cl. ................................. 73/180; 73/182; 73/861.65
[58] Field of Search ............ 73/180, 182, 183, 861.65, 73/861.68

[56] References Cited

U.S. PATENT DOCUMENTS

| | | | |
|---|---|---|---|
| 2,725,746 | 12/1955 | Young | 73/180 |
| 3,318,146 | 5/1967 | DeLeo et al. | 73/180 |
| 3,482,445 | 12/1969 | DeLeo et al. | 73/182 |
| 3,585,859 | 6/1971 | DeLeo et al. | 73/383 |
| 4,096,744 | 6/1978 | DeLeo et al. | 73/212 |

*Primary Examiner*—Donald O. Woodiel
*Attorney, Agent, or Firm*—Kinney, Lange, Braddock, Westman and Fairbairn

[57] ABSTRACT

A strut or boom mounted probe having separate pressure sensing ports or sets of ports axially spaced at three locations on the probe. The ports are normally located on the probe so that at 0° angle of attack, the pressure difference is zero between a set of opposite ports at the most rear location. As the angle of attack varies from zero angle, the pressure difference at the aft measuring ports increases, in a positive sense with increasing angle of attack (alpha), and, in a negative sense with increasing opposite (negative) alpha angle. Pressure difference between the rear ports is also proportional to the impact pressure, $q_c$, where $q_c$=pitot pressure minus static pressure=$p_t - p$. The sensor normally has a pitot pressure opening in its forward extremity and static ports located along the forward cylindrical barrel section of the unit. The pressure difference at the rear ports is divided by the pressure difference of the forward ports. A unique ratio of pressure is developed which is a function of angle of attack or flow direction and pitot pressure and this alternate ratio may be utilized using pitot and alpha (angle of attack) pressure only. The sensor is particularly useful at high angles of attack and provides readings at angles of attack in the range of ±50°. Angles of side slip (beta) and other flow angles in an established measuring plane may be sensed as well.

13 Claims, 6 Drawing Figures

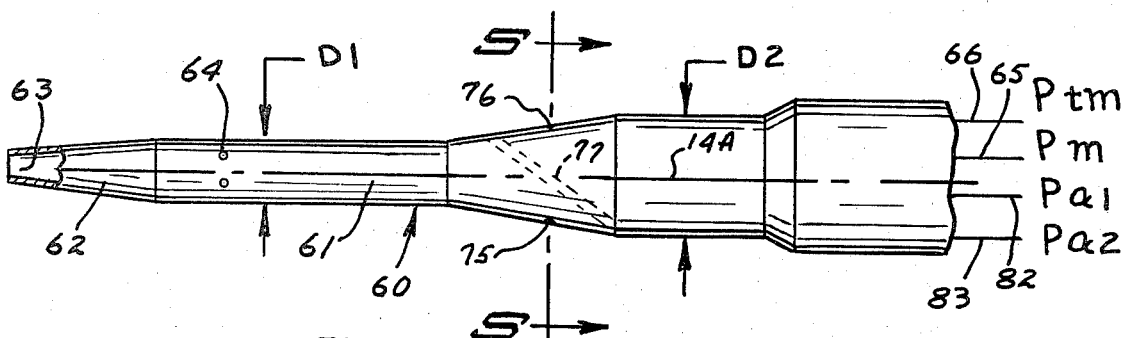
FIG. 4
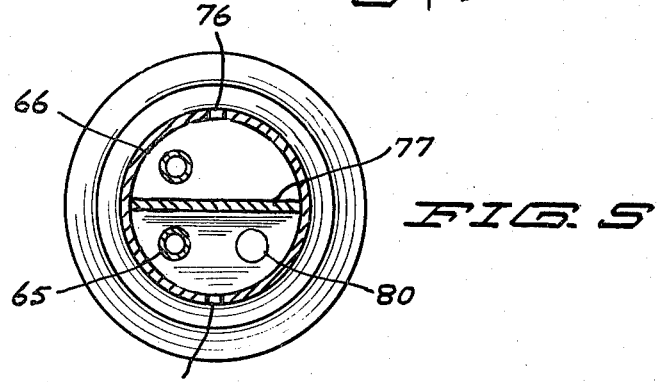
FIG. 5
FIG. 6
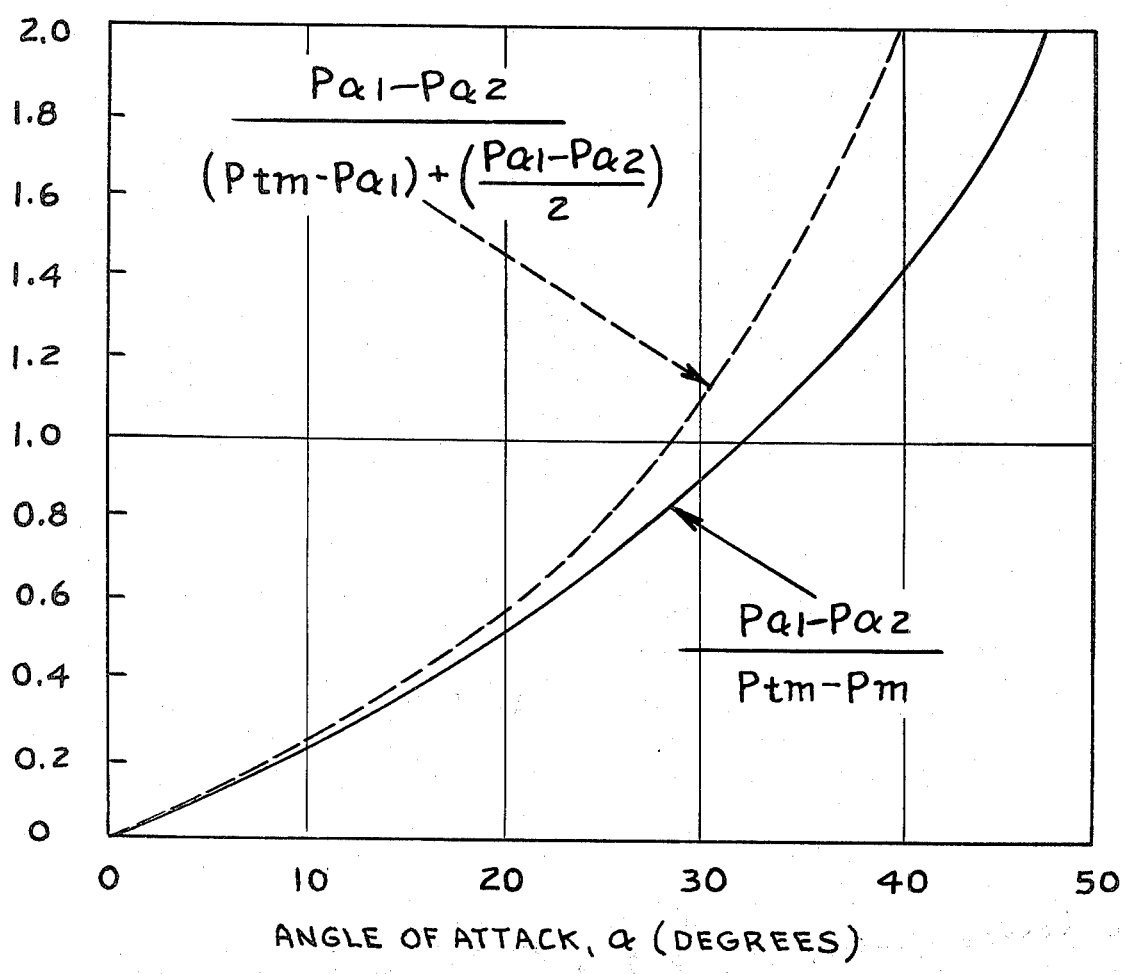
ANGLE OF ATTACK, α (DEGREES)

PRESSURE SENSOR FOR DETERMINING AIRSPEED ALTITUDE AND ANGLE OF ATTACK

BACKGROUND OF THE INVENTION

1. Field of the Invention

The present invention relates to a single strut mounted or boom mounted pressure measuring probe which provides multiple pressure readings to obtain necessary aircraft performance data across a wide range of angles of attack.

2. Prior Art

The advantages of having aerodynamically compensated static pressure sensing probes as well as incorporating pitot sensing and dual static systems in the same probe have been known. Various devices which provide satisfactory results in many conditions have been advanced. For example, an aerodynamically compensated dual static probe is shown as U.S. Pat. No. 3,482,445. In that patent the probe is provided with discontinuity or surface irregularity which causes an alteration of measured static pressure, thereby compensating for other defects such as adjacent portions of the fuselage so that dual compensating static sensing can be achieved by proper location of a pair of ports on the probe.

In many applications, it is necessary to measure local angle of attack on or ahead of the aircraft fuselage. In some prior devices, a set of pressure ports are generally made on the forward extremity of the probe so that the pressures sensed at these ports will vary in a known relationship; from such variation, the local angle of attack can be determined. For example, a pressure sensing instrument for aircraft flow angle is described under U.S. Pat. No. 3,318,146. This device discloses a combination of ports on a hemispherical shape subtending to a cylinder where a minimum of 3 and a maximum of 5 pressure ports are installed. The angle of attack is determined from a ratio $(p_1-p_2)/(p_t-p_4)$.

Both the above stated pitot-static tubes and angle of attack sensors have been extensively used in the past, but generally each unit is installed at different locations; thereby adding to the weight, drag, cost, as well as the complexity of the installation. A pressure sensor for determining altitude, airspeed, and angle of attack is shown in the U.S. Pat. No. 4,096,744. In this device, the functions of measuring pitot pressure, static pressure, and angle of attack pressures, are combined into a single unit. Angle of attack, using the device, may be determined by using a specific pressure ratio described in that patent and is very useful. However, the device disclosed herein provides increased sensitivity at angles of attack above 25° or so and thus in advanced aircraft which do operate at angles of attack well above 40°, the increased sensitivity is a positive factor.

SUMMARY OF THE INVENTION

The present invention relates to a sensing probe for use on aircraft which is small enough to meet design criteria from a physical standpoint, yet can provide three separate sets of measuring ports that provide pressure measurements to obtain accurate static pressure, pitot pressure, and flow angle pressure even at high flow angle. Port means are axially spaced in position along the axial surface of the axially symmetric probe. At zero flow angle, the pressure difference from the angle sensing pressure ports will be zero since they are placed at equal distances from the probe forward tip and on opposite sides of the surface. As the flow angle increases or decreases from zero, the differential pressures sensed between these ports will change and this measured difference is used to determine angle of attack (or sideslip).

Other outputs of pitot pressure and static pressure are obtained through two additional pressure measurements. Design of the pitot pressure and static pressure ports are independent of the angle of attack sensing ports. The pitot and static pressure ports are provided to meet the installation requirements depending on a particular aircraft. Static pressure ports are almost always aerodynamically compensated in a known manner. The flow angle can be angle of attack as shown or angle of sideslip, which is measured in a plane 90° to the illustrated plane, or any orientation in between these positions.

The alpha or angle of attack sensing ports are normally located diametrically opposite each other on a conical or increasing diameter section of the probe located to the rear of the conventional pitot-static portion of the probe. The pressure differences obtained at the angle of attack sensing ports are always substantially higher than those obtained in the device in U.S. Pat. No. 4,096,744 which aids in sensing and calculation, but less than those obtained in the device shown in U.S. Pat. No. 3,318,146. However, the present device is useful in particular at extreme angles of attack where impact pressure is low.

In the present device, pressure difference at the angle of attack ports is also zero at zero degrees angle of attack. The pressure difference at the angle of attack sensing ports is proportional to the product of angle of attack times impact pressure. To obtain angle of attack, it is necessary to divide the pressure difference by the measured impact pressure obtained from the forward section of the unit, or an acceptable substitute pressure which may be derived from other measured parameters.

BRIEF DESCRIPTION OF THE DRAWINGS

FIG. 4 is a side elevational view of a boom mounted probe made according to the present invention;

FIG. 5 is a sectional view taken as on line 5—5 in FIG. 4; and

FIG. 6 is a graphical representation illustrating the output of the probes in relation to angle of attack.

DESCRIPTION OF THE PREFERRED EMBODIMENTS

Figure 1:
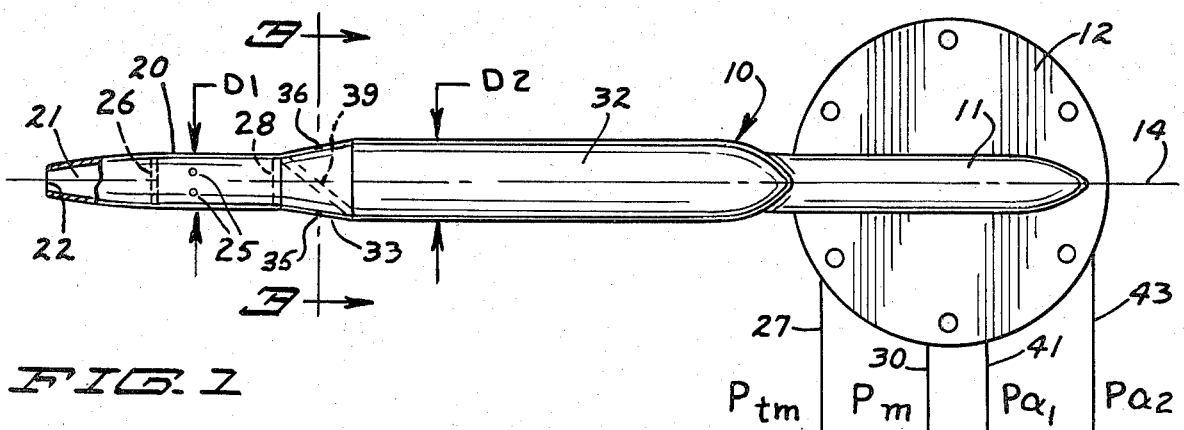
FIG. 1 is a side elevational, part schematic view of a strut mounted pressure sensor made according to the present invention, with schematic representations of instruments included in the figure.
Figure 2:
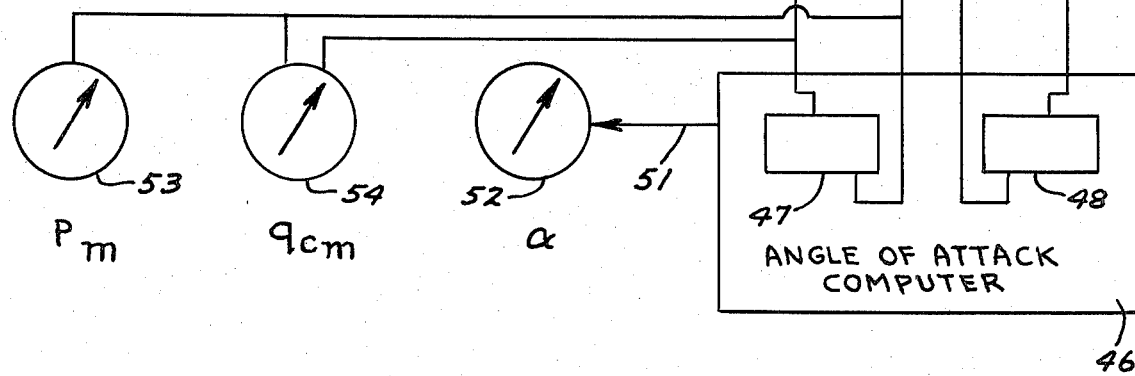
FIG. 2 is a bottom view of the device of FIG. 1.
Figure 3:
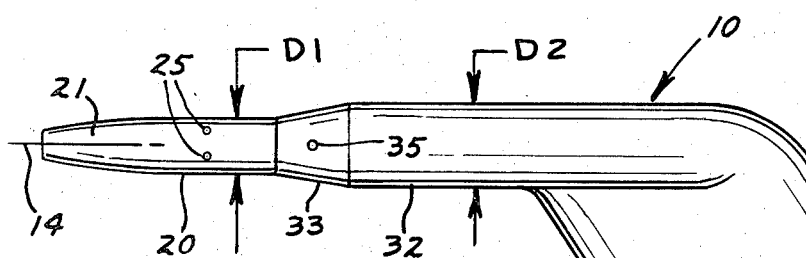
FIG. 3 is a sectional view taken as on line 3—3 in FIG. 1.
Figure 3:
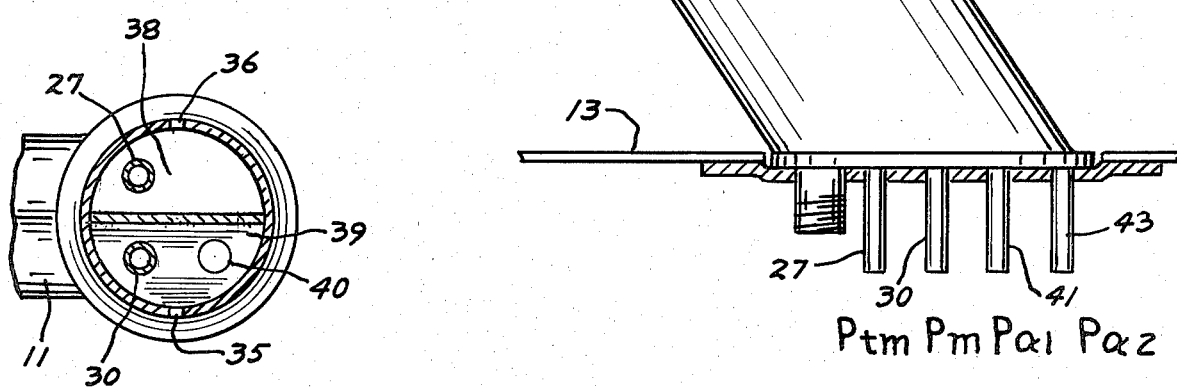

FIGS. 1 through 3 show a strut mounted probe indicated generally at 10, having a mounting strut 11, mounted with a flange 12 to the skin 13 of the aircraft. FIG. 1 is a side view shown with the probe's longitudinal central axis indicated at 14 at a zero angle of attack. Deviations of the axis from the reference position relate to the angle of attack.

The probe has a barrel with three distinct sections, including a first generally cylindrical section 20 having an outer diameter $D_1$ which is generated about the longitudinal axis. The section 20 includes a tapered forward end 21, and the leading or upstream end has an opening indicated at 22 therein which is used for sensing the pitot pressure. This pressure is called a measured pitot pressure ($p_{tm}$). A plurality of static pressure sensing ports 25 are defined through the barrel wall of the probe in the first section 20. These ports 25 can be arranged as desired around the circumference or outer surface of the forward section 20, and the ports open into an interior chamber which is segregated from the pitot opening 22 by a bulkhead indicated in dotted lines at 26. A line 27 opens through bulkhead 26 to provide the measured pitot pressure to remote instruments. An extension of this line 27 is shown in FIG. 1 and is labeled "$p_{tm}$".

Also, the static pressure ports are isolated by a rear bulkhead indicated in dotted lines at 28 in FIG. 1 to form an interior static pressure chamber. A static sensing line or tube 30 is connected to provide the static pressure from the chamber defined by the bulkheads 26 and 28 to the remote instruments. Line 30 is also shown in FIG. 3. The ports 25 are located in a region which provides static pressure signals indicated as "$p_m$".

In addition to the forward probe section 20, the probe has a rear cylindrical section 32 which has a diameter of $D_2$, which is larger than $D_1$. A transition section 33 is of expanding diameter and joins the first section 20 and the rear section 32. The outer surface of the transition section provides a generally conical outer surface as shown. A first angle of attack sensing port or alpha sensing port indicated at 35, which is on the bottom of the probe is provided through the wall of the tubular barrel section of the probe. As can be seen in FIG. 3, the first or lower alpha sensing port 35 opens into an interior chamber defined by a bulkhead 39 which may be slanted or offset so that it separates the ports 35 and 36. The bulkhead 39 must separate the pressure sensed at the first alpha sensing port 35 from the pressure in a chamber 38 on the upper and rear side of the bulkhead 39 which is open to a co-axial second or upper alpha sensing port 36.

A suitable opening 40 through the bulkhead 39 leads to a pressure carrying tube indicated generally at 41 in FIG. 1 to provide the pressure signal from the first alpha sensing port 35. The open chamber 38 within aft barrel section 32 and strut 11 communicates the pressure from port 36 to a pressure sensing tube 43 that carries the pressure signal from the second angle of attack or alpha sensing port 36. The pressures at the two angle of attack sensing ports are indicated in FIG. 1 as $p_{a1}$ and $p_{a2}$.

As will be explained, the pressure signals are subtracted and the difference divided by a pressure function. The axes of ports 35 and 36 and axis 14 define a plane and deviations of axis 14 in that plane from a reference comprise changes of angle of attack. The probe is compact, lightweight, and yet with the port arrangement disclosed provides for angle of attack reading across a wide range. It is particularly useful for angles of attack up to 50° or so in both direction. As shown in FIG. 1, an angle of attack computer indicated at 46 can be utilized for determining angle of attack and this computer utilizes a first differential pressure sensor 47 which provides an electrical output proportional to the pressure difference between the measured pitot pressure and the measured static pressure ($p_{tm}-p_m$).

A second differential pressure sensor 48 is provided to generate an electrical signal proportional to the difference between the pressures measured at the angle of attack ports 35 and 36. Usually the signal is proportional to the pressure at the upper ports subtracted from the pressure at the lower port ($p_{a1}-p_{a2}$). While the signals generally are proportional to the difference between the pressure signals at the angle of attack ports, other ratios can be utilized if desired.

The angle of attack computer is a standard instrument that also provides a division function. The electrical output from the differential pressure sensors is divided by a quantity and the ratio signal is provided along a line 51 to a typical angle of attack measuring indicator 52. Additionally, the measured static pressure ($p_m$) can be read out directly on an instrument indicated at 53. This measured static pressure can be compensated, as previously mentioned, in a known manner to provide the true static pressure. For the purposes of this application, the quantity $p_m$ or measured static pressure will be meant to include compensated static pressure if such is desired.

Additionally, the impact pressure, $q_c$ is derived on an indicating instrument 54 if desired. $q_c$ is a quantity equal to the pitot pressure minus the static pressure. With measured pressures being utilized, this quantity is ($q_{cm}=p_{tm}-p_m$).

The $q_c$ function is used for normalizing pressures conventionally in aircraft instrumentation, and is an important quantity used in air data sensing.

The outputs along line 51 as a function of angle of attack for two different functions are graphically illustrated in FIG. 6, and will be more fully explained in connection with both embodiments of the invention.

In FIG. 4 a boom mounted probe 60 is shown. This boom mounted probe is a probe used at the forward end of an aircraft, and includes a tubular barrel having a first or forward cylindrical section 61 having a diameter $D_1$, and a tapered leading end section 62 which has a pitot pressure sensing port 63 at its leading end. The first cylindrical barrel section 61 has a plurality of static pressure sensing ports 64 extending through the barrel wall and arranged as desired. These static pressure sensing ports 64 open into a chamber that is isolated from other sections of the barrel as shown previously. The static pressure signal is carried through a tubular line 65. The pitot pressure from the sensing port 63 is carried along a line 66, as in the previous form of the invention. The boom mounted probe also has a second or rear generally cylindrical barrel section 70 of diameter $D_2$ which is larger than $D_1$. Barrel sections 61 and 70 are joined by an increasing diameter or tapered barrel section 71. The tapered barrel section 71 is generally conical as shown and has a uniform increase in diameter from the rear end of the first cylindrical section 61 up to the front or leading end of the second cylindrical section 70. The tapered section 71 has angle of attack or alpha pressure sensing ports 75 and 76, respectively, at the bottom and top thereof, and these ports open into separate chambers that are defined by a bulkhead such as a slanted bulkhead 77 as shown in FIGS. 4 and 5. Opening 80 leads to a line 82 and line 83 opens to port 76. The lines carry individual pressures sensed at the angle of attack sensing ports 75 and 76, respectively. As shown, the port 75 is on the bottom side of the probe, and the port 76 is on the top side of the probe. The axis of the ports 75 and 76 coincide, as shown, and together with the longitudinal axis 14A of the probe, define a plane in which the angle of attack is measured.

Thus, the same pressures are measured with the boom type probe as with the strut mounted probe shown in FIGS. 1 through 3. Also, the angle of attack or alpha sensing ports are located diametrically opposite each other in the tapered or increasing diameter section 71.

The basic measured pressure ratio $(p_{\alpha 1} - p_{\alpha 2})/(p_{tm} - p_m)$ as shown in FIG. 6 provides a function which varies as a function of angle of attack. This ratio will vary linearly with angle of attack up to about 20 degrees and thereafter, with the ports for sensing angle of attack ($p_{\alpha 1}$ and $p_{\alpha 2}$) positioned diametrically opposite and having axes which lie in a plane defining the plane in which the angle of attack measurement is to be taken, will thereafter provide a ratio that is nonlinear and which increases with increasing angle of attack. Slopes of this ratio as shown in FIG. 6 in a solid line, vary from 0.02/deg. to 0.04/deg. at low angles of attack. The slope at these low angles of attack depends on the angle of the surface utilized for the section 33 of the probe shown in FIGS. 1–3 or the section 71 as shown in FIG. 4. Lower slope values occur at low angles of surface (in the range of 10 degrees), while high cone angles in the range of 25 degrees for the increasing surface will yield the greater curve slope of 0.04 per degree.

The increasing slope of the solid line curve shown in FIG. 6, which is identified above, are a definite advantage since an aircraft flying at high angles of attack generally flies at low values of impact pressure $(p_{tm} - p_m)$. Higher sensitivity per degree of angle of attack at the higher angles of attack insure satisfactory signal levels even when the impact pressure value is low.

At high angles of attack, near fifty degrees, the ratio sensitivity per degree of angle of attack is approximately 0.20. That is, the pressure ratio varies at twenty percent of the impact pressure per degree of angle of attack. The ratio is well defined to at least fifty five degrees angle of attack with the present probe, and this sensitivity of 0.20 per degree of angle is substantially higher than the sensitivity at this high angle of attack shown in U.S. Pat. No. 3,318,146, which has a ratio sensitivity of about 0.088 per degree.

The ratio $(p_{\alpha 1} - p_{\alpha 2})/[(p_{tm} - p_{\alpha 1}) + (p_{\alpha 1} - p_{\alpha 2})/2]$ plotted as a function of angle of attack is shown in dashed lines in FIG. 6. This ratio does not contain the measured static pressure, $p_m$, and thus hence is independent of the $p_m$ measurement. Near zero angle of attack the slope of ratio vs angle is higher than the first ratio, (solid line curve), varying from 0.025 per degree to 0.05 per degree depending on the surface angle of sections 33 or 71. At high angles of attack, near forty degrees, the ratio sensitivity per degree is about 0.20. The ratio is well defined to at least forty five degrees angle of attack. The use of the alternate ratio has an advantage because of independence from the static measurement, $p_m$, and high slopes (greater sensitivity per degree).

The angle of the tapered surface sections 33 and 71 at the pressure port area may vary but normally the angle of the increasing surface relative to the longitudinal axis of the respective probes, would be between five and twenty five degrees. The taper surface angle does affect the ratio sensitivity per degree with the lower sensitivity occurring at the lower cone angles. However, the ratio sensitivity per degree increases significantly at higher angles of attack. This is increasingly important because aircraft of the future are required to perform at what now seems to be unusually high angles of attack, and thus reliable readings are necessary to insure properly monitored performance.

Generally, in the second form of the invention shown in FIG. 4, the diameter of the first cylindrical section ($D_1$) would be in the range of 0.75 to 1.0 inches, and the diameter of the second cylindrical section ($D_2$) would range between 1.0 and 1.5 inches. The boom mount requires a little larger diameter rear barrel than the strut mounted barrel. In the first form of the invention the strut mounted probe, $D_1$ is in the range of 0.5 to 0.75 inches and $D_2$ ranges between 0.75 and 1.25 inches. Of course, the second section is larger than the first section so the surface where the alpha ports are located is expanding in rearward or downstream direction.

The placement of the alpha or angle of attack sensing ports must be on the increasing size barrel section in order to get the readings desired for adequate sensitivity, and the alpha ports are of course diametrically opposed, with their axes defining a plane in which the angle of attack measurement should be made. The axes of the alpha ports are normally coincidental. The angle of attack is measured in a plane generally defined by the longitudinal axis of the probe and the alpha port axes. The angle of attack is determined with respect to a reference position of the probe longitudinal axis.

The use of the three distinct barrel sections; a first cylindrical section; a second cylindrical section of larger diameter; and a tapered, increasing size section having the alpha sensing ports, provides the structure for obtaining the necessary pressure relationships to provide sensitivity that increases as angle of attack increases above a known value. The impact pressure ($q_c$) tends to decrease substantially at high angles of attack and thus increased sensitivity is important for strong, reliable signals.

The alpha ports are aft or to the rear of the pitot pressure port and the static sensing ports, and with the alpha ports oppositely facing and on the expanding portion of the elongated probe, the pressure difference between these ports is a function of $q_c$. Thus, the two ratios disclosed both provide a reliable correlation to angle of attack with increasing sensitivity at high angles of attack. The ratios are:

$$(p_{\alpha 1} - p_{\alpha 2}) \qquad (a)$$

and $$\frac{p_{\alpha 1} - p_{\alpha 2}}{(p_{tm} - p_{\alpha 1}) + \left(\dfrac{p_{\alpha 1} - p_{\alpha 2}}{2}\right)} \qquad (b)$$

Where $p_{\alpha 1}$ and $p_{\alpha 2}$ represent pressures sensed at the angle of attack sensing ports, $p_{tm}$ is measured pitot pressure and $p_m$ is measured static pressure.

The probes are elongated tubes as shown, and the rear sections comprise main-body portions of the probes, in that the probes are supported by the rear sections or portions.

The description herein deals with a specific embodiment for measuring angle of attack for convenience. The flow angle measured can be oriented relative to any reference plane and can be sideslip or other angles using the pressure relationships disclosed.

Also port means or sets centered on axes which define a plane in which the angle is measured may be used. That is instead of one round port, an elongated port or two ports symmetrically located may be used for sensing angles in a plane centered on the oppositely directed ports.

What is claimed is:

1. An air data sensing probe for sensing the angle of relative movement between the probe and a fluid stream, comprising a barrel having a longitudinal axis and including:

a leading end and a trailing end, a first generally cylindrical section, a second generally cylindrical section spaced rearwardly from the first generally cylindrical section, the second section being larger diameter than the first generally cylindrical section, and an increasing diameter surface section generated about the longitudinal axis and joining the first and second sections the increasing diameter surface section forming an included angle of between in the range of 5° and 25° with respect to the longitudinal axis;

a pair of pressure sensing port means on said increasing diameter section, said port means having axes which together with the barrel longitudinal axis define a plane in which an angle to be sensed is to be measured with respect to a reference position of the longitudinal axis;

means to subtract the pressure at one of said port means from the other; and means providing a signal representing a ratio of the difference between the pressures sensed at the respective port means and a pressure quantity including a pitot pressure function which provides a ratio value which is nonlinear with increasing angles of above about twenty degrees with respect to the reference position of the longitudinal axis.

2. The apparatus of claim 1 wherein the means to determine the difference and the means to divide provide the ratio $(p_{\alpha 1} - p_{\alpha 2})/(p_{tm} - p_m)$, wherein $p_{\alpha 1}$ and $p_{\alpha 2}$ are the pressures measured at the respective ports, $p_{tm}$ is the measured pitot pressure at the leading end of the probe, and $p_m$ is the measured static pressure adjacent the probe.

3. A probe having a longitudinal axis, a leading end section and a trailing end section, the trailing end section being a larger cross sectional size than the leading end section, and an expanding surface section joining said leading and trailing end sections and having a pair of oppositely facing ports defined therein, which ports have axes lying in a plane passing through the lontitudinal axis of said probe the pressure of fluid at the leading end of the probe comprising a pitot pressure;

means to individually sense the pressures at each of said ports and to determine the difference between said pressures when there is fluid motion relative to said probe, and means to divide the difference obtained by a quantity comprising $(p_{tm} - p_{\alpha 1}) + (p_{\alpha 1} - p_{\alpha 2})$ wherein $p_{\alpha 1}$ and $p_{\alpha 2}$ are pressures measured at said ports, and $p_{tm}$ represents the pitot pressure at the leading end said probe for determining the angle of attack of the longitudinal axis of said probe relative to the fluid with respect to a reference position such that the quantity obtained after division has a progressively greater increase for each degree of increase of angle of attack when the angle of attack exceeds a known amount.

4. The apparatus of claim 3 wherein the trailing section of said probe has a strut mounted thereon for mounting the probe to an aircraft.

5. The apparatus of claim 3 wherein the leading and trailing sections of the probe are generally cylindrical, and said expanding surface section is generally conical, the cone angle being in the range of five to twenty five degrees with respect to the longitudinal axis of the probe.

6. The apparatus of claim 3 wherein said probe has a pitot pressure sensing opening at the leading end thereof to provide the quantity $p_{tm}$.

7. The apparatus of claim 6 wherein the leading cylindrical section is elongated and has static pressure sensing port means thereon, said static pressure sensing port means providing a pressure quantity $p_m$, and the means to divide dividing by a signal representing the quantity $(p_{tm} - p_m)$.

8. An air data sensor for determining the angle of attack of the sensor relative to the direction of fluid moving relative to the sensor comprising a probe having an elongated probe barrel with a longitudinal axis, said barrel having first and second barrel sections of substantially similar cross sectional shape, but of different cross sectional dimensions, said second barrel section being of larger dimension than the first barrel section and trailing the first section with respect to the direction of relative fluid motion, and a barrel transition section defining an exterior surface joining said first and second barrel sections and increasing in size from the first barrel section to the second barrel section, first and second port means open through the barrel and symmetrically formed about a common central axis and facing in opposite directions, said common axis intersecting the longitudinal axis to thereby define a plane, means to individually sense the pressures at each of said first and second port means and provide signals representative of the sensed pressures as $p_{\alpha 1} - p_{\alpha 2}$ at the first and second ports, respectively, means to provide a signal representative of the pitot pressure at the leading end of the barrel as $p_t$, means for providing the difference between the signals representing the pressures at the first and second port means and for dividing said difference by a signal representing a pressure function including the signal representing the pitot pressure and pressure at the probe related to measured static pressure for thereby providing a ratio signal which varies as a function of the angle of attack and which ratio signal increases in output per degree of change of angle of attack as the angle of attack increases above a known amount.

9. The sensor as specified in claim 8 wherein the plot of the provided ratio relative to the angle of attack of the barrel with respect to the direction of the fluid stream substantially comprises one of the curve shapes substantially as plotted in FIG. 6 of the drawings.

10. The apparatus of claim 8 wherein the means to provide and divide comprises means to supply a signal representing a quantity selected from a group consisting of the following quantities:

$$(p_{\alpha 1} - p_{\alpha 2})/(p_{tm} - p_m) \quad \text{(a)}$$

and $$\frac{p_{\alpha 1} - p_{\alpha 2}}{p_{tm} - p_{\alpha 1} + \left(\dfrac{p_{\alpha 1} - p_{\alpha 2}}{2}\right)} \quad \text{(b)}$$

where $p_{\alpha 1}$ and $p_{\alpha 2}$ comprise signals representing the pressures at the port means, respectively; $p_{tm}$ is a signal representing pitot pressure; and $p_m$ is a signal representing static pressure of the fluid adjacent the probe.

11. A pitot-static probe of elongated, slender form for sensing pitot and static air-pressures and for sensing angle of flow of the probe relative to a fluid stream comprising an elongated forward portion having a forward-facing port for sensing pitot pressure, said forward portion being cylindrical throughout a substantial part of its length, an elongated main-body portion axially aligned with, and aft of, said forward portion, said main-body portion at least at its forward end being of larger cross-section than said forward portion, and an intermediate portion interconnecting said forward and main-body portions, said intermediate portion being of increasing section in the aft direction from said forward portion to the main-body portion, port means for sensing static pressure positioned on said forward portion, and first and second port means positioned on said intermediate portion for sensing angle of flow, said first and second port means facing in opposite directions and being centered on a diametrical line, said intermediate portion having a surface forming an angle of between five degrees and twenty five degrees with respect to the central longitudinal axis of the probe, and means to provide a ratio of pressure sensed on the probe which increases in sensitivity to flow angle as the flow angle exceeds a known angle.

12. The probe of claim 11 wherein the means to provide provides a ratio selected from one of the group of ratios comprising:

$$(p_{\alpha 1}-p_{\alpha 2})/(p_{tm}-p_m) \qquad (a)$$

$$\frac{p_{\alpha 2} - p_{\alpha 2}}{(p_{tm} - p_{\alpha 1}) + \frac{(p_{\alpha 1} - p_{\alpha 2})}{2}} \qquad (b)$$

where $p_{\alpha 1}$ and $p_{\alpha 2}$ represent the pressures at the first and second angle of attack sensing port means, respectively, $p_{tm}$ represents the pressure measured at the forward facing port, and $p_m$ represents the pressure sensed at the static pressure sensing port means.

13. The method of determining the angle of flow of a probe having a longitudinal axis with respect to the direction of relative fluid movement past the probe, said probe having a first leading end section of generally cylindrical configuration, and an expanding size conical section downstream from and joining the leading end section, and a second generally cylindrical section of larger size than the first generally cylindrical section joining the conical section at its downstream end, comprising the steps of providing a pitot pressure signal representing the pressure at the leading end of the probe and a signal representing the static fluid pressure adjacent to the probe;

providing on the conical section first and second oppositely facing port means each being centered on the same plane passing through the longitudinal axis of the probe;

individually sensing the pressures at each of said first and second port means; and correlating the pressures at the first and second port means and selected other sensed pressures for providing a signal representing a ratio selected in accordance with one of the ratios formed in the following group of (a) and (b):

$$(p_{\alpha 1}-p_{\alpha 2})/(p_{tm}-p_m) \qquad (a)$$

$$\frac{p_{\alpha 1} - p_{\alpha 2}}{(p_{tm} - p_{\alpha 1}) + \frac{(p_{\alpha 1} - p_{\alpha 2})}{2}} \qquad (b)$$

when $p_{\alpha 1}$ and $p_{\alpha 2}$ represent the pressure at the first and second port means, respectively, $p_{tm}$ represents pitot pressure at the leading end of the probe, and $p_m$ represents static pressure adjacent to the probe, to provide a ratio which increases in sensitivity to angles of flow when the angles of flow being measured range upward from about twenty degrees.

* * * * *

UNITED STATES PATENT AND TRADEMARK OFFICE
CERTIFICATE OF CORRECTION

PATENT NO. : 4,378,696

DATED : April 5, 1983

INVENTOR(S) : Richard V. DeLeo et al.

It is certified that error appears in the above-identified patent and that said Letters Patent is hereby corrected as shown below:

Front page, entry No. 54, and Column 1, line 3, Title should read --PRESSURE SENSOR FOR DETERMINING AIRSPEED, ALTITUDE AND ANGLE OF ATTACK; Column 3, line 59 "direction" should be --directions--. Column 4, line 22, after "pressure" (second occurrence) insert a period --.-- Column 6, line 44, should be corrected to read as follows:

$$\frac{P_{\alpha 1} - P_{\alpha 2}}{P_{tm} - P_m}$$

Column 7, line 48, (Claim 3, line 7), "lontitudinal" should be --longitudinal--; Column 7, line 34, (Claim 2, line 1), change "Claim 1" to -Claim 3-; Column 7, line 56, (Claim 3, line 15), the quantity after the word "comprising" should be as follows:

$$(P_{tm} - P_{\alpha 1}) + \frac{(P_{\alpha 1} - P_{\alpha 2})}{2}$$

Column 7, line 58, (Claim 3, line 17), after "end" insert --of--. Column 8, line 60 should be corrected as follows (Claim 10, line 5):

$$\frac{P_{\alpha 1} - P_{\alpha 2}}{P_{tm} - P_m}$$

UNITED STATES PATENT AND TRADEMARK OFFICE
CERTIFICATE OF CORRECTION

PATENT NO. : 4,378,696
DATED : April 5, 1983
INVENTOR(S) : Richard V. DeLeo et al.

It is certified that error appears in the above-identified patent and that said Letters Patent is hereby corrected as shown below:

Column 9, lines 36, 37 and 38, (Claim 12, lines 5, 6 and 7) correct the equation to read:

$$(P_{tm} - P_{\alpha 1}) + \frac{P_{\alpha 1} - P_{\alpha 2}}{(P_{\alpha 1} - P_{\alpha 2})}$$
$$\overline{2}$$

Column 10, line 29, Claim 13, line 25, should be corrected as follows:

$$\frac{P_{\alpha 1} - P_{\alpha 2}}{P_{tm} - P_m}$$

Signed and Sealed this

Fourteenth Day of August 1984

[SEAL]

Attest:

GERALD J. MOSSINGHOFF

Attesting Officer

Commissioner of Patents and Trademarks